United States Patent
Takahashi et al.

(10) Patent No.: US 6,559,972 B1
(45) Date of Patent: May 6, 2003

(54) METHOD AND APPARATUS FOR PROCESSING IMAGE DATA

(75) Inventors: Noaki Takahashi, Osaka-fu (JP); Kazuyuki Murata, Kyoto-fu (JP); Takehito Yamaguchi, Osaka-fu (JP); Hideyuki Kuwano, Osaka-fu (JP); Yuji Okada, Hyogo-ken (JP); Joji Tanaka, Osaka-fu (JP); Kenji Hisatomi, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/460,814

(22) Filed: Dec. 14, 1999

(30) Foreign Application Priority Data

Dec. 17, 1998 (JP) .............................. 10-359458

(51) Int. Cl.$^7$ ............................... G06F 15/00
(52) U.S. Cl. .................. 358/1.2; 358/1.9; 358/3.27; 382/99
(58) Field of Search ..................... 358/1.2, 1.9, 461, 358/521, 3.01, 3.21, 539, 3.27, 3.07; 382/274, 299; 345/3.3, 3.4

(56) References Cited

FOREIGN PATENT DOCUMENTS

JP          8-180180          7/1996

*Primary Examiner*—Mark Wallerson
*Assistant Examiner*—Twyler Lamb
(74) *Attorney, Agent, or Firm*—McDermott, Will & Emery (57) ABSTRACT

An image data processing apparatus for storing a multi-valued image data inputted from an image scanner as a plural image data of various resolutions and applying them for tasks, such as printing and displaying. After the conversion by the resolution converting device to a multi-valued image of low resolution, the data is binarized by the binarization circuit and stored after the encoding by the encoding circuit. Meanwhile the encoded data is decoded as the binary data by the decoding circuit and then inputted to a display screen. The image scanner includes the first gradation converting device for converting the intermediate density area of the image data to a specific high or low density. Therefore, it is possible to increase the compression rate at the time of the encoding of the display image data.

19 Claims, 12 Drawing Sheets

METHOD AND APPARATUS FOR PROCESSING IMAGE DATA

BACKGROUND OF THE INVENTION

1. Technical Field

This invention relates to an image processing apparatus for storing an image data inputted from image data inputting means in storage means as a plural image data in various resolution, and making proper use of them for the printing and the visual display.

2. Description of the Prior Art

It has been proposed an image data processing apparatus wherein an image data inputted from image data inputting means such as an image scanner is stored into storage means such as a magnetic disc, an optical disc, or a magneto-optical disc, and the image data fetched from the storage means on demand is outputted from image data outputting means such as a printer.

The Japanese patent laid-open publication No. 8-180180 discloses an image data processing apparatus wherein an image data inputted from image data inputting means is stored in storage means as a plural image data of various resolution, which are made proper use for the printing the displaying and so on.

Figure 12:
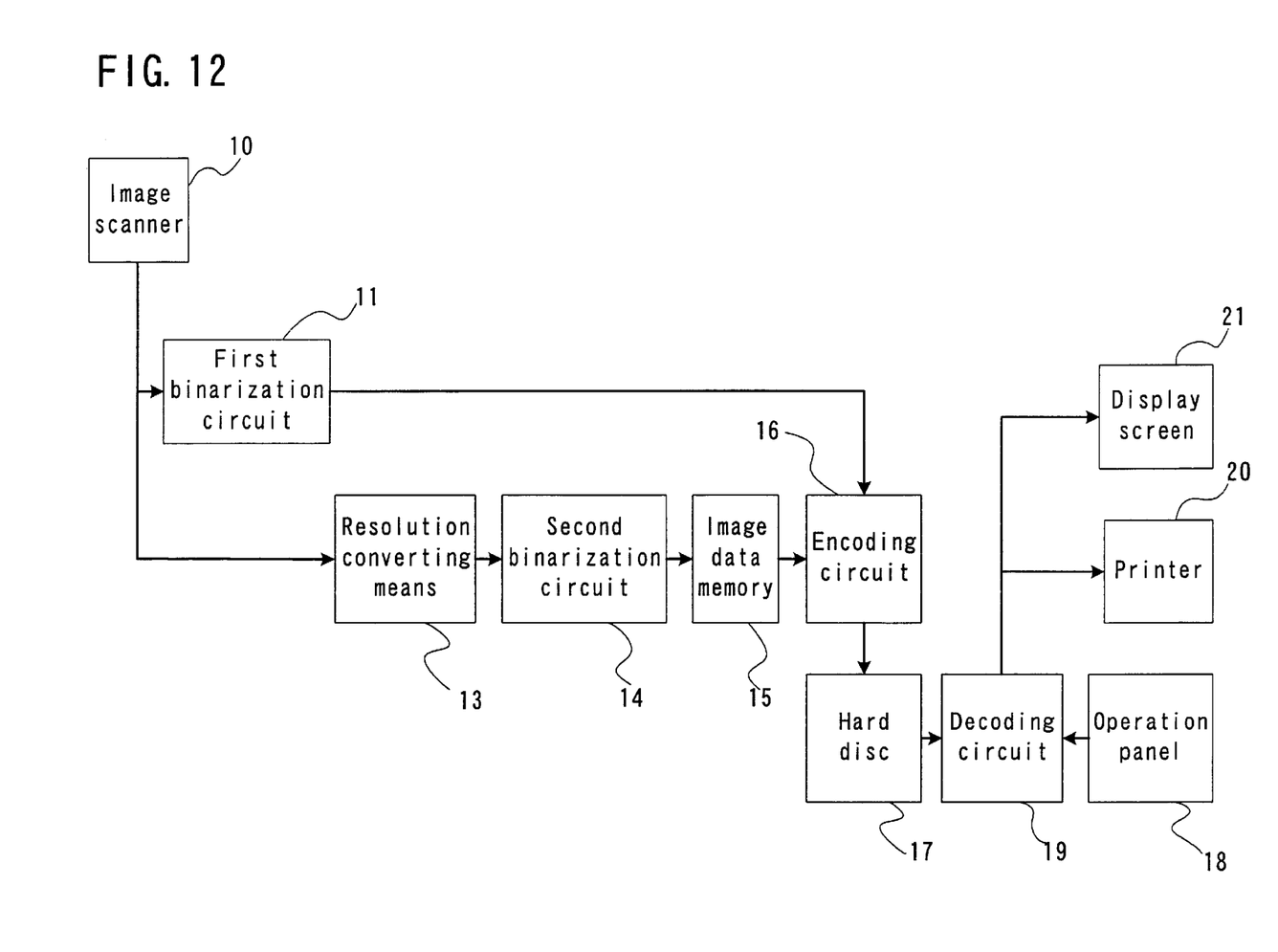
FIG. 12 is a schematic block diagram of a conventional image data processing apparatus.

FIG. 12 is a schematic block diagram showing an example of the above-mentioned image data processing apparatuses. In the image data processing apparatus shown in FIG. 12, a multi-valued image data inputted from image data inputting means 10 such as an image scanner is binarized as a standard image data of high resolution for the printing by a binarization circuit 11, and then stored in storage means 17 such as a hard disc.

A multi-valued image data inputted from the image data inputting means 10 has the resolution of 400 DPI, for example. The multi-valued image data is stored in the storage means 17 without changing the resolution as described above, and on the other hand the multi-valued image data is converted to an image data for the displaying (which is called 'a display image data' hereinafter) changed to low resolution, for example, 200 DPI, by a resolution converting circuit 13, and binarized by a second binarization circuit 14, and then stored in an image data memory 15 temporarily. First the standard image data is compressed and coded (represented by "encoded" hereinafter) by an encoding circuit 16. After the processing the display image data is outputted from the image data memory 15, and encoded by the encoding circuit 16, and then stored in the storage means 17 corresponding to the standard image data.

The standard image data of high resolution stored in the storage means 17 is decoded by a decoding circuit 19 and inputted to a printer 20 for the printing.

A display screen 21 has the facility for displaying the 256 gradation because 8 bits are used for each color of RGB Red, Green, Blue), but the resolution of the display screen 21 is small relatively, for example, more or less 200 DPI. Accordingly, the display image data of the above low resolution is to be utilized mainly for the displaying on the display screen 21 in case of the searching of image data.

If it is arranged that a plural image data of various resolution are available selectively, an user can browse the preview of the outlined image data (image data of low resolution) in case of the expansion and displaying of image data, and then image data of high resolution can be obtained later on Accordingly, in case of searching image data while browsing them on the display screen 21, it is possible to skip over an unnecessary processing of expanding the image data of high resolution. Therefore it is possible to arrange an image data processing apparatus with efficient operational performance.

In case there is remarkable difference between the resolution of the printer 20 and that of the display screen 21, when the image data is displayed on the display screen 21 in the same resolution as the printer 20, a part of the image data can be displayed only. Therefore, if the apparatus is constituted so as to be able to use the above-mentioned display image data, the great advantage can be given.

In case of filing an original of an intermediate-tone image data such as a photograph, however, when the original is processed by the simplified binarization for converting to binary digit, that is 1 or 0, according to a specific threshold value, it brings the remarkable deterioration of picture quality. Accordingly, the original is arranged to be binarized by the pseudo intermediate-tone processing such as the error diffusion method of reproducing the intermediate-tone in the proportion of white and black per unit area.

But the pseudo intermediate-tone processing causes the frequent change of black and white in the intermediate density area having a large change of density, so that the compression rate of the encoded data could decline. (For example, since the encoded data changing black and white periodically such as "1111000011110000. . . ", in other words when a high density or a low density area repeats itself for several times, can be represented by the information of the repeat of 4 white & 4 black, the compression rate is high.)

Namely, there is a problem that the conventional image data processing apparatus must be provided with a mass memory because the compression rate for the encoding is low.

SUMMARY OF THE INVENTION

This invention is proposed to solve the above-mentioned problems in the conventional apparatus. And the objects are to reduce the size of the image data in the intermediate density area by deteriorating the gradation performance of the image data in said area to a specific degree and thereby to increase the compression rate at the encoding and to improve the storage efficiency at the filing.

Figure 1:
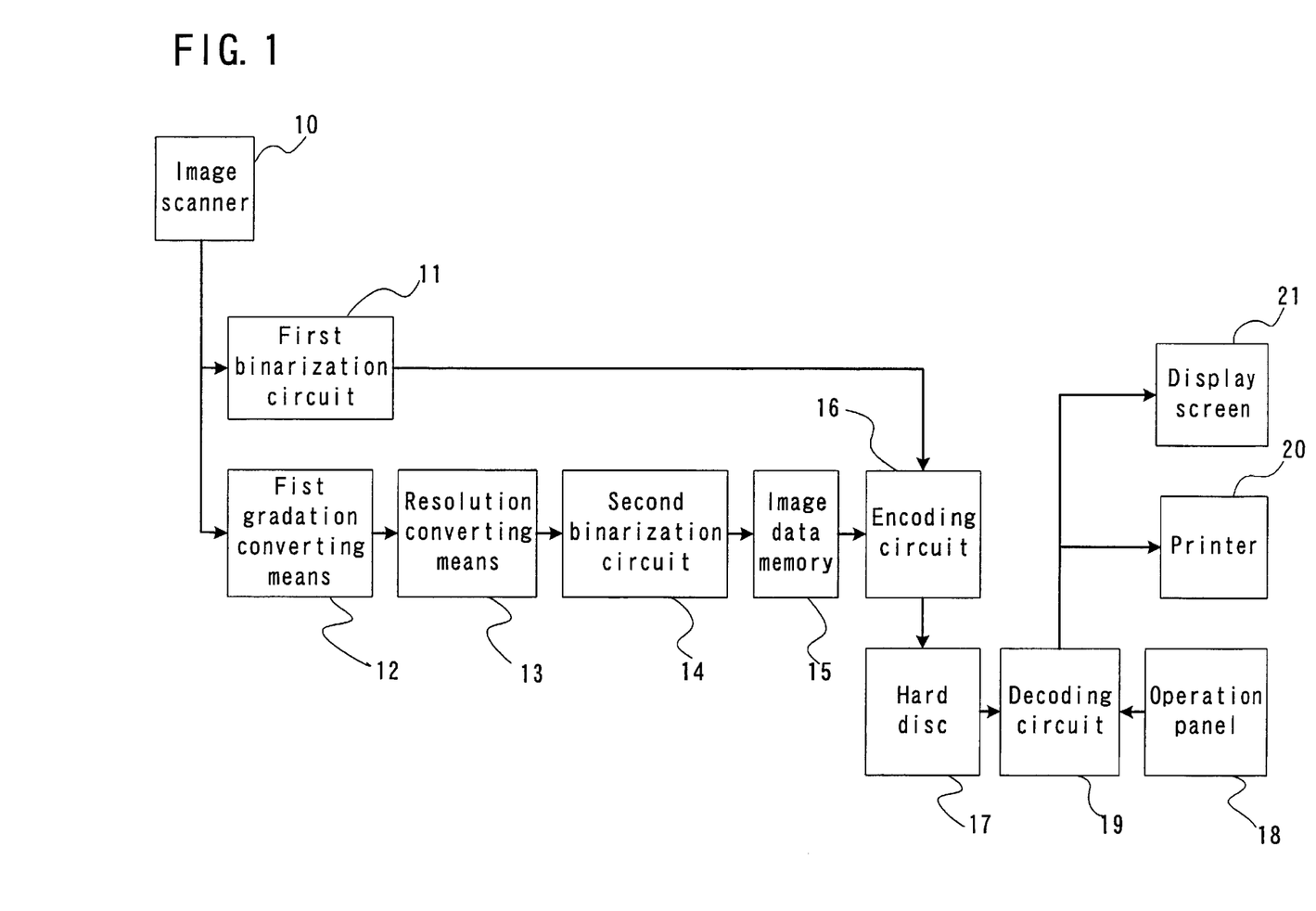
FIG. 1 is a schematic block diagram of an image data processing apparatus in the first embodiment of the present invention.

Namely, in order to achieve the above objects, as shown in FIG. 1, an image data processing apparatus in the invention is presumed that a multi-valued image data inputted from image data inputting means 10 is encoded not only as a standard image data but also as a display image data of the lower resolution than that of the standard image data, and both of them are stored in storage means 17, and the display image data stored in the storage means 17 is decoded and then inputted to browsing means 21 such as a display screen.

And the image data processing apparatus is provided at the preceding step of resolution converting means 13 for obtaining the display image data with first gradation converting means 12 for converting the intermediate density area of the multi-valued image data to a specific high density or specific low density.

Figure 5:
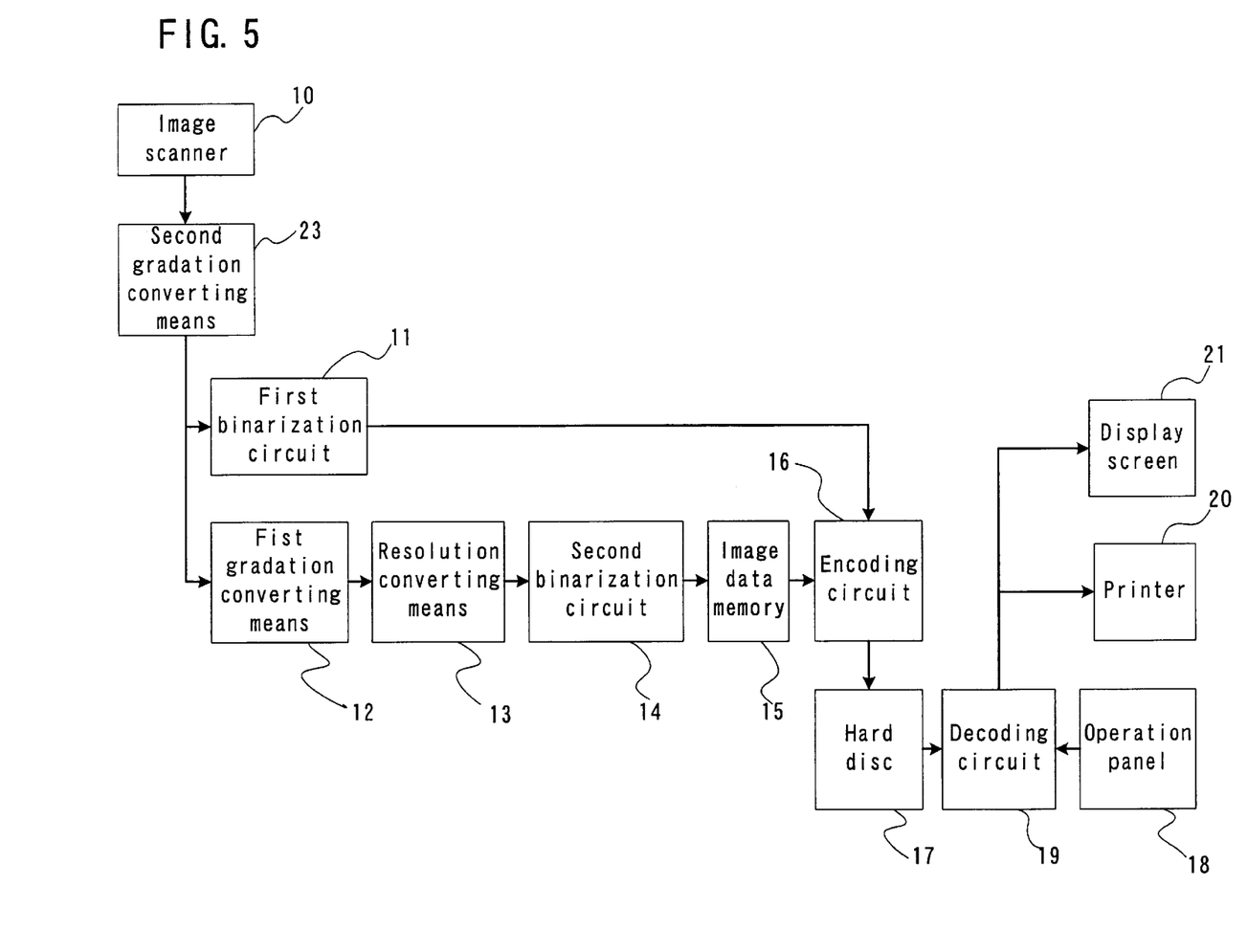
FIG. 5 is a schematic block diagram of an image data processing apparatus in the second embodiment of the invention.

And as shown in FIG. 5, the image data processing apparatus in the invention can be provided with second gradation converting means 23 for converting the intermediate density area in the multi-valued image data obtained from the image data inputting means 10 to the specific high density or the specific low density.

Therefore, it is possible in the image data processing apparatus in the invention to reduce the size of the image data in the intermediate density area by deteriorating the gradation performance of the image data in said area to a specific degree without touching the picture quality and thereby to increase the compression rate at the encoding and to improve the storage efficiency at the filing.

Figure 7:
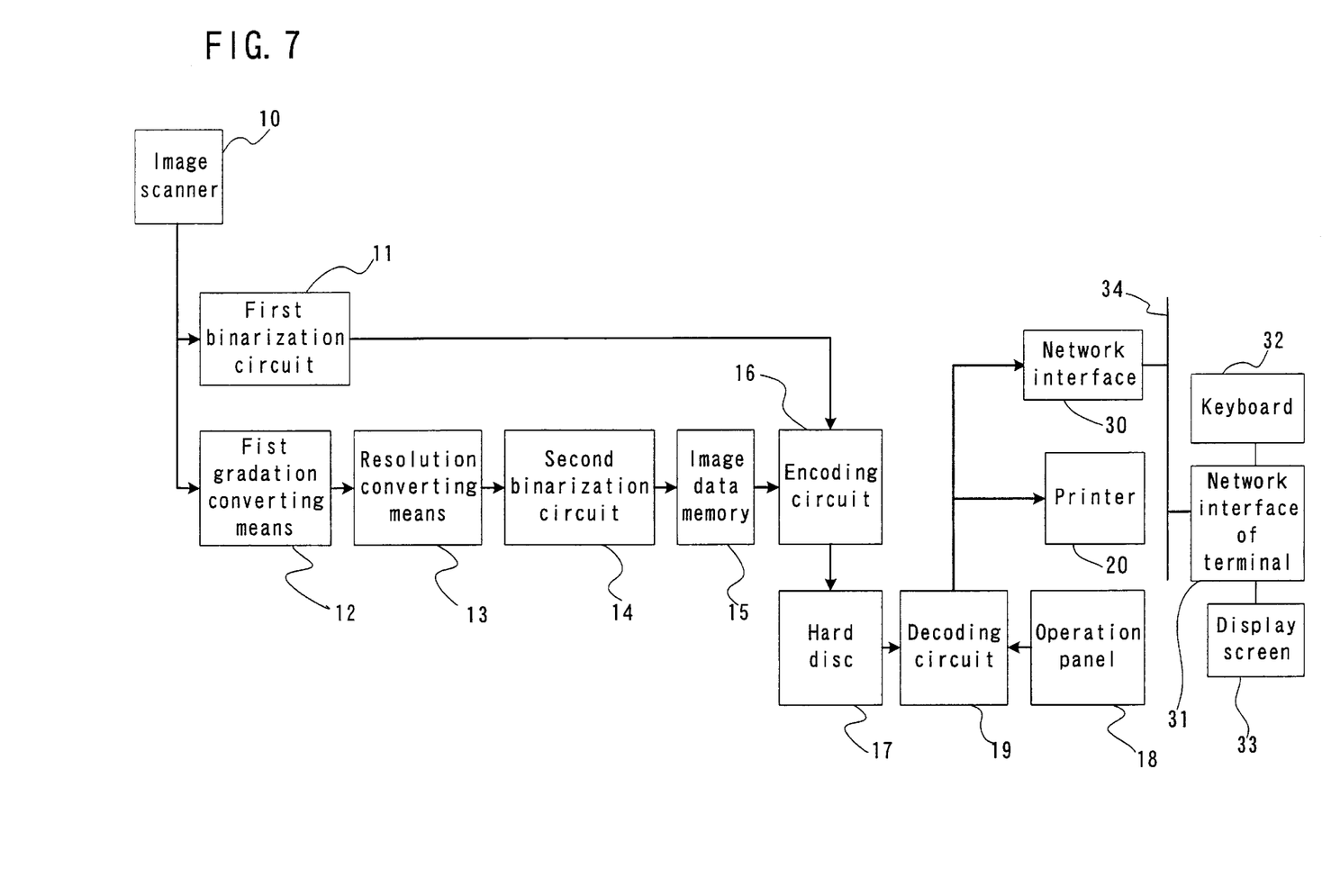
FIG. 7 is a schematic block diagram of an image data processing apparatus in the third embodiment of the invention.

Moreover as shown in FIG. 7, the image data processing apparatus can comprise image data transferring means 30 and 31 for transferring online the decoded display image data, and browsing means 33 for displaying the display image data transferred from the image data transferring means 30 and 31. And otherwise the apparatus can comprise image data transferring means 30 and 31 for transferring online the encoded data corresponding to the display image data stored in the storage means 17, decoding means (not shown, for decoding the encoded data transferred from the image data transferring means 30 and 31, and browsing means 33 for displaying the decoded image data.

Figure 8:
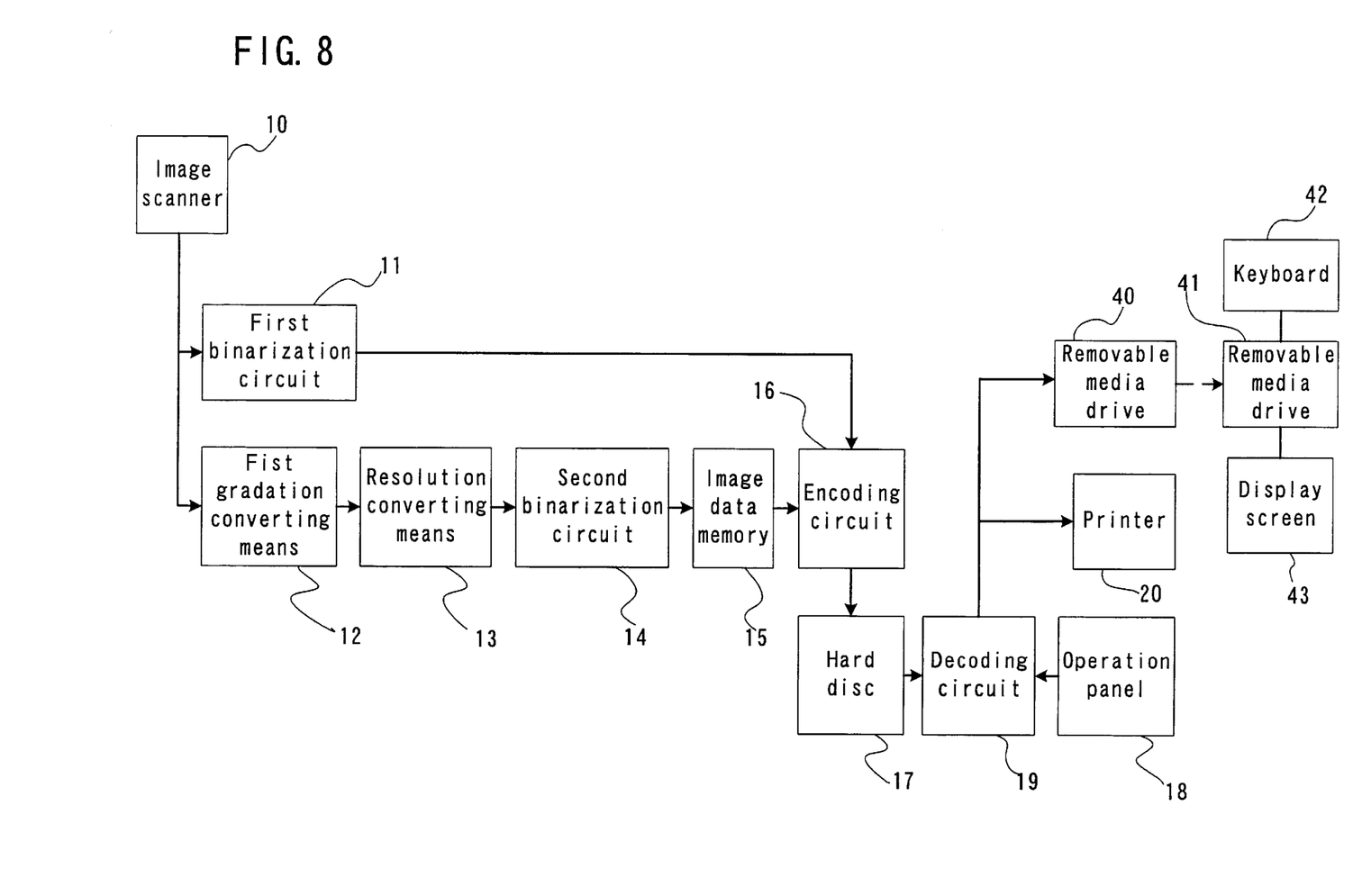
FIG. 8 is a schematic block diagram of an image data processing apparatus in the fourth embodiment of the invention.

To the contrary, the image data processing apparatus as an off-line state shown in FIG. 8 can comprise image data writing means 40 for storing the decoded display image data in a removable storage media, image data reading means 41 for reading the display image data acquired from the removable storage media, and browsing means 43 for displaying the display image data thus read. And otherwise the apparatus can comprise image data writing means 40 for storing in a removable storage media the encoded image data corresponding to the display image data stored in the storage means 17, image data reading means 41 for reading the encoded image data from the removable storage media, decoding means (not shown) for decoding the encoded image data thus read, and browsing means 43 for displaying the decoded image data thus decoded.

On the other hands, as the image data inputting means in the image data processing apparatus it is possible to use at least one among an image scanner 10 for reading an original image data optically, a fax modem 50 for receiving an image data via dedicated line or a public line, or a printer interface 51 for receiving an image data via dedicated line or a network.

DETAILED DESCRIPTION OF THE PREFERRED EMBODIMENTS

The preferred embodiments of the present invention are explained hereinafter according to the drawings.

FIG. 1 is a schematic block diagram showing an image data processing apparatus in the invention The constitution and operation of this embodiment are described as follows.

Fist, an image scanner 10 obtains a multi-valued image data by reading an original image data at the specific high-resolution, for example 400 DPI. A first binarization circuit 11 binarizes as a standard image data the multi-valued image data of the resolution of 400 DPI inputted from the image scanner 10. The binarization method at this time is arranged to be selected alternatively from either the simplified binarization method according to specific threshold values or the pseudo intermediate-tone method (for example, the error-diffusion method and the di thering method). Namely, while it is sufficient for characters to be processed by the simplified binarization method, in case of the intermediate-tone image data such as photographs the binarization is performed according to the pseudo intermediate-tone method, and as a result it is possible to reduce the deterioration of the picture quality.

Figure 3:
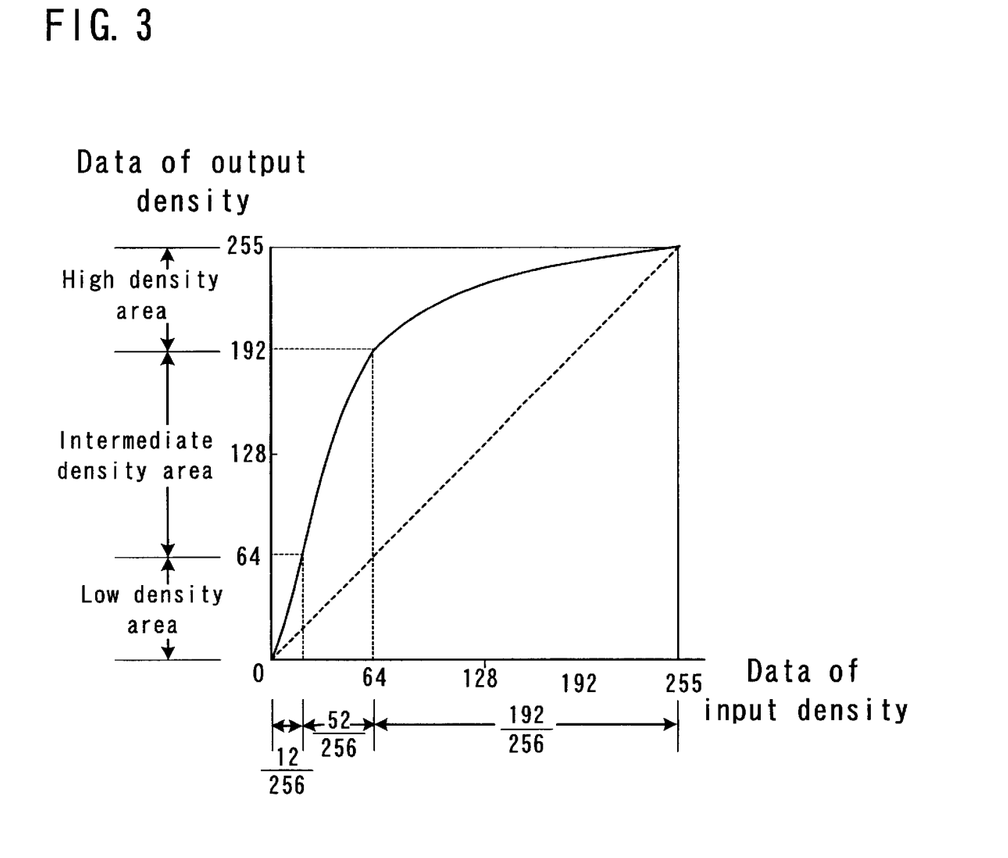
FIG. 3 is a graph showing the gradation performance after converting an image data in the first conversion characteristic to be set in a look-up table.
Figure 4:
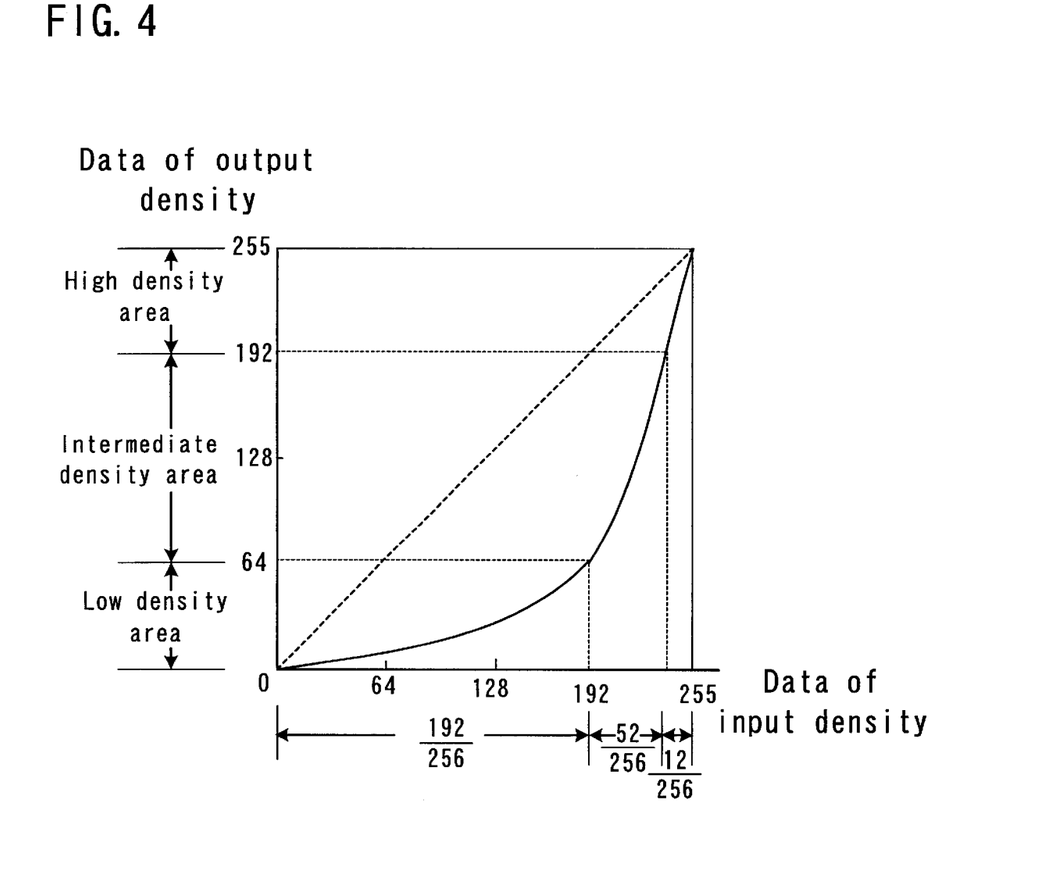
FIG. 4 is a graph showing the gradation performance after converting an image data in the second conversion characteristic to be set in a look-up table.

Meanwhile, the multi-valued image data outputted from the image scanner 10 is also inputted to a first gradation converting means 12 (for example, a gamma table composed of a look-up table). In accordance with the contents preset in the look-up table the first gradation converting means 12 converts the intermediate density area of the multi-valued image data (the gradation between the 64 level and the 192 level, for example, in case the gradation is represented by 256 levels in which the 0 level means the density 0% of the input data and the 256 level means the density 100% of the input data) to the specific high-resolution or the specific low-resolution In other words, the first gradation converting means 12 performs the density conversion so as to concentrate the output density of the pixels within the intermediate density area (the gradation between the 64 level and the 192 level in case the gradation is represented by 256 levels) onto the high density area (the gradation between the 192 level and the 256 level) as shown in FIG. 3 or onto the low density area (the gradation between the 0 level and the 64 level) as shown in FIG. 4.

Next, a resolution converting circuit 13 converts the multi-valued image data of the high-resolution converted as above to that of the lower resolution than it, for instance the multi-valued image data of the resolution of 200 DPI, as a result a display image data can be obtained The display image data is inputted to a second binarization circuit 14. At the time of the resolution converting, determining whether the above density converting is the converting either to the high density area or to the low density area, and it is arranged to perform the processings corresponding to the result (which will be described later).

The display image data inputted to the second binarization circuit 14 is binarized here and then stored in an image data memory 15 temporarily. The binarization method used in this step is arranged to switch between the simplified binarization and the pseudo intermediate-tone binarization properly. The volume of the image data memory 15 is the size enough to store the display image data of 200 DPI temporarily, that is to say, 1 M-bit even if storing the whole of an A3 sized original.

After that, either one of the standard image data inputted from the first binarization circuit 11 or the display image data stored temporarily in the image memory 15 is inputted to an encoding circuit 16. Namely, the encoding circuit 16 encodes at real time the standard image data by means of the specific encoding method such as the JBIG method and so on, while the image scanner 10 is reading the original image. After completing the encoding of the standard image data, the display image data is encoded by means of the above encoding method along with reading from the image data memory 15.

The encoded data of the standard image data of high-resolution and that of the display image data of low-resolution, which are obtained according to the above steps, are stored corresponding to each other in a hard disc 17. At this time, an user can input an ID number or a keyword specifying an image data from an operation panel 18. The ID number or the keyword is also stored corresponding to the two kinds of encoded data.

According to the above steps the original image data read by the image scanner 10 is stored as the standard image data of the initial high-resolution and the display image data of the low-resolution of a half of the initial resolution.

When an user wants to fetch the image data stored in the hard disc 17, the ID number or the keyword set as above is inputted from the operation panel 18. After specifying the image data according to the ID number or the keyword, a decoding circuit 19 reads out and decodes either one of the encoded data of the standard image data or of the display image data. And the decoded data is outputted to either one of the printer 20 or the display screen 21 in accordance with the resolution. In other words, when the printing is instructed from the operation panel 18, the standard data is inputted to the printer 20 and then printed out. In case of instructing the displaying the display image data is inputted to the display screen 21 and then is displayed on the screen.

As described above, it is arranged in the invention that an image data in the intermediate density area is deteriorated in specific degree so that the image data in the area can be reduced and thereby the compression rate can be increased at the time of the encoding. Therefore it is possible to improve the storage efficiency at the filing.

The object of which the gradation performance is deteriorated in specific degree should be only a display image data, but not a standard image data. This is the reason that, since the standard image data is an image data for the printing it is not preferable in terms of the compensation for the picture quality to deteriorate the gradation performance of the standard image data in specific degree. Meanwhile, since the display image data is an image data to be displayed on the display screen 21 for the user's information, it is not necessary to give attention to the picture quality of it.

It is considered how the compression rate at the encoding changes together with the specific deterioration of the gradation performance as described above, and explained hereinafter.

Figure 2:
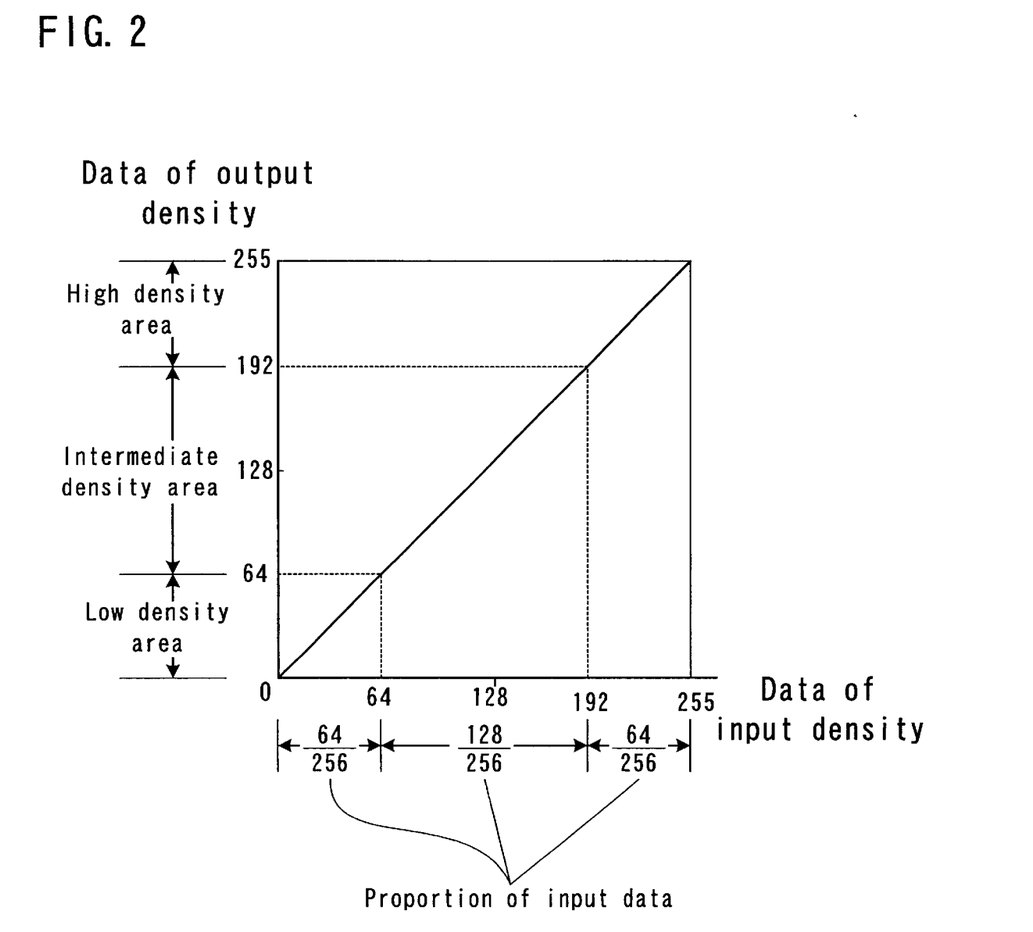
FIG. 2 is a graph showing the gradation performance before converting an image data to be set in a look-up table.

In FIG. 2 showing the gradation performance of the image data before being converted by the first gradation converting means 12, assuming that each compression rate in the low density area and the high density area, in both areas the density change is small, is an average of 10% respectively, and the compression rate in the intermediate density area, in this area the density change is large, is an average of 50%, the whole average of the compression rate for the density change of the input image data is represented by the following expression when encoding the image data of which the output image data changes in linear, $$64/256 \times 10\ (\%) + 128/256 \times 50\ (\%) + 64/256 \times 10\ (\%) = 30\ (\%)$$

To the contrary, as shown in FIG. 3, when the first gradation converting means 12 converts the intermediate density area of the input image data to the high density area, the average of the compression rate is calculated and expressed as follows.

Namely, like the case in FIG. 2, when the input image data is divided into three areas according to the density, each proportion of the areas is shown in FIG. 3: 12/256 is the proportion of the low density area that the gradation of the output density is between the 0 level and the 63 level, 52/256 is that of the intermediate density area that the gradation of the output density is between the 64 level and the 191 level and 192/256 is that of the high density area that the gradation of the output density is between the 192 level and the 256 level. Accordingly, the whole compression rate in this characteristic is calculated as follows.

$$12/256 \times 10\ (\%) + 52/256 \times 50\ (\%) + 192/256 \times 10\ (\%) = 18.125\ (\%)$$

Therefore, in case the same image data is encoded, it is better to convert the image data by the first gradation converting means 12. As a result, it is possible to improve the average of the compression rate.

The reason why the average compression rate changes as above is that the linear characteristic thus inputted is converted to the characteristic shown in FIG. 3 by the first gradation converting means 12 and thereby the intermediate density area becomes narrow wherein the average compression rate does not decline so much.

Though the image data as a whole in higher density than that of the input image data is outputted by the converting the image data is thinned to a half by the gradation converting means 13 in the sequential step. Accordingly when the image data is displayed on the display screen 21, it does not occur that the density of the whole image data increases. When the searched image data is printed out actually, the standard image data of high resolution encoded by the encoding circuit 16 is read from the hard disc 17 and decoded by the decoding circuit 19 and then printed out. Therefore, the deterioration of the picture quality cannot be appeared.

Likewise, FIG. 4 shows the second characteristic of the first gradation converting means 12 for converting the intermediate density area of the input image data to the low density area. In the characteristic shown in FIG. 4, the proportion of three areas of the output density of the image data is 192/256 in the low density area, 52/256 in the intermediate density area, and 12/256 in the high density area. Accordingly, the whole compression rate is calculated in this characteristic, and expressed as follows.

$$192/256 \times 10\ (\%) + 52/256 \times 50\ (\%) + 12/256 \times 10\ (\%) = 18.125\ (\%)$$

At this time, like the case in FIG. 3, the average compression rate also increases relative to the linear characteristic shown in FIG. 2.

In this case, however, the whole density of the image data after the converting becomes low. When the resolution converting means 13 performs the thinning simply, the image data of the low density and fine lines are disappeared.

Figure 10:
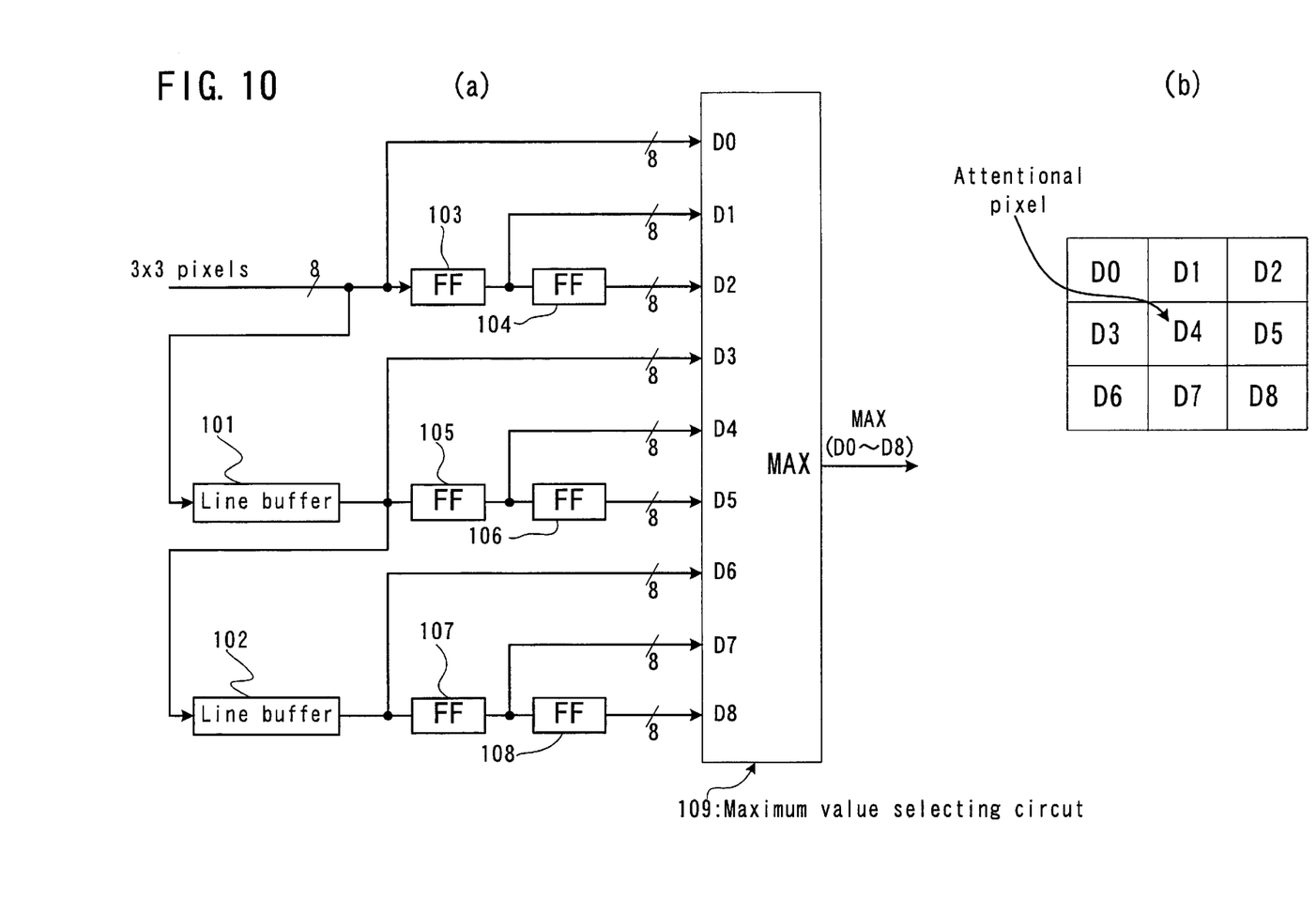
FIG. 10 is an example of constitution of an interpolating circuit.

Therefore, the thinning is not performed simply but there is necessity for the image data to perform the interpolating for changing to some specific high density. The interpolating can be performed by the following steps, that is to say, 3×3 pixels (pixels from D0 to D8) shown in FIG. 10(*b*) are inputted to the interpolating circuit shown in FIG. 10(*a*) and then the pixel which has the highest density among the 3×3 pixels is outputted as an attentional pixel. Namely, the interpolating circuit comprises two units of line buffer 101 and 102, 6 units of flip-flop 103 to 108, and a maximum-value selecting circuit 109. The 3×3 pixels are inputted to the maximum-value selecting circuit 109. The maximum-value selecting circuit 109 selects and outputs a pixel of the highest density (the constitution of the interpolating circuit and the level of the interpolating are not limited specially).

Figure 11:
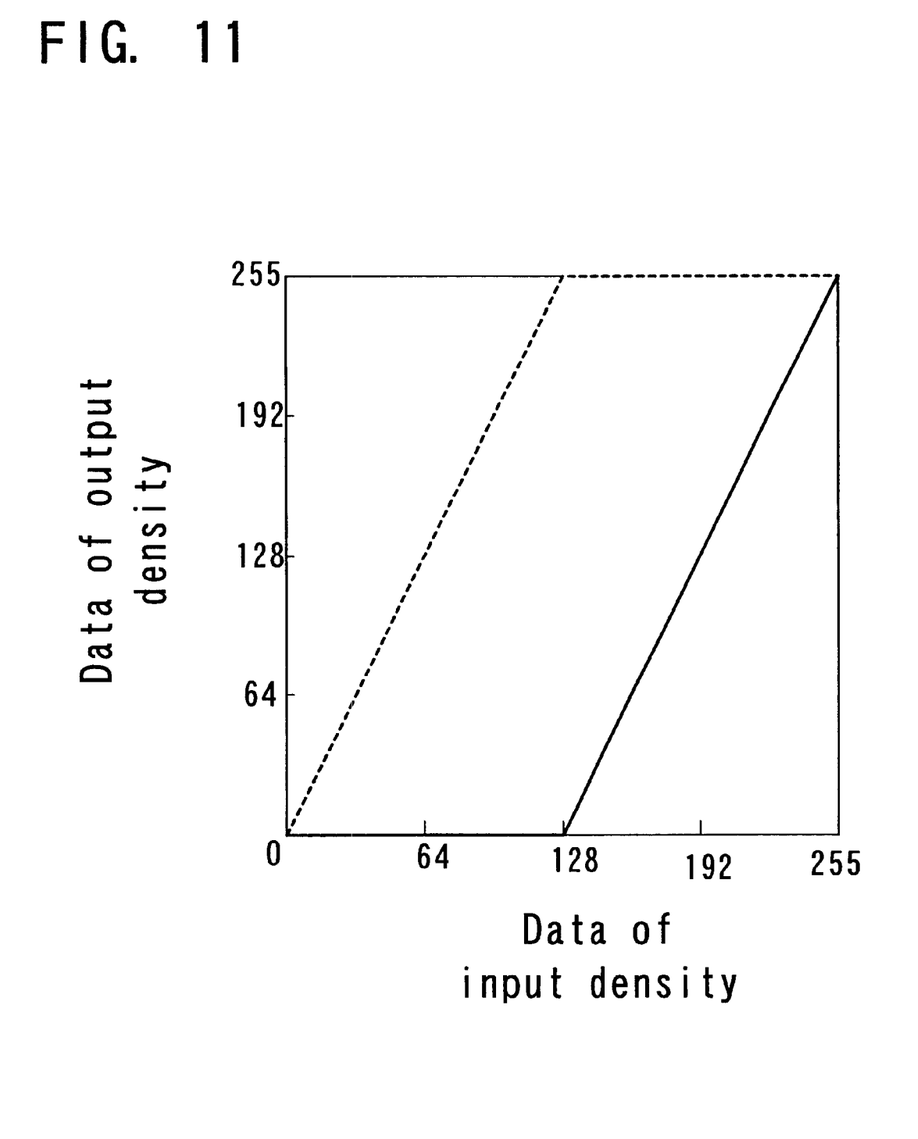
FIG. 11 is a graph showing the other gradation performance to be set in a look-up table.

In the above description, the first gradation converting means 12 uses the gamma table composed of the look-up table, but may use a combination logical circuit for the converting (not shown). And if the characteristic has a monotone increasing function for converting the intermediate density area to the specific high density or the specific low density, the characteristic may not be that shown in FIG. 3 or 4. For instance, by using the combination logical circuit it is possible to obtain the converting characteristic shown as a dot line in FIG. 11 (in case of converting to the specific high density) or that shown as a solid line in FIG. 11 (in case of converting to the specific low density).

The resolution converting circuit 13 is arranged to convert the inputted image data of high-resolution of 400 DPI to the image data of low-resolution of 200 DPI, and also can be arranged to convert to the image data such as of 150 DPI or of the other resolution than it. Moreover, it is possible to convert to image data of a plural resolution, store them and make proper use of said data.

Next, the second embodiment is explained according to FIG. 5.

The point different from the first embodiment is that a second gradation converting means 23 is provided on the output side of the image scanner 10. And the second gradation converting means 23 performs the gradation converting for a multi-valued image data outputted from the image scanner 10, and the converted data is inputted to the first binarization circuit 11 and the first gradation converting means 12. The second gradation converting means 23 is also composed of a look-up table same as the first gradation converting means 12, of which the converting characteristic is preset from CPU not shown.

Figure 6:
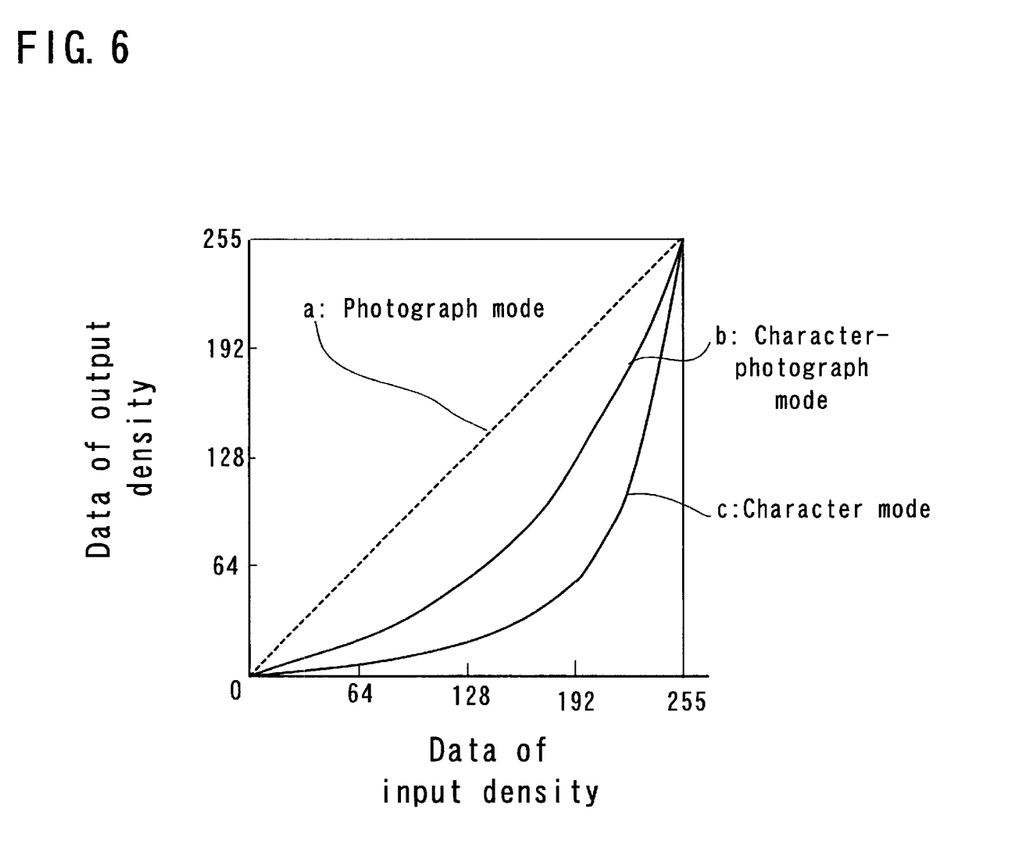
FIG. 6 is a graph showing the conversion characteristic to be set in a gradation converting circuit.

FIG. 6 shows the converting characteristic set in the second gradation converting means 23. Here, when an original is a data including an intermediate-tone image such as a photograph (which is called ' photograph mode' hereinafter), the converting characteristic is linear and excellent in gradation performance as shown by a in FIG. 6. And when an original is a data of characters (which is called 'character mode' hereinafter), the converting characteristic is set so as to diminish the change of the output density in the low density area and to enlarge the change of the output density in the high density area in order to enhance the edges of black and white, which is shown by c in FIG. 6. Moreover, when an original is a data including characters and photographs (which is called 'character-photograph mode' hereinafter), the converting characteristic is set so as to be an intermediate characteristic between the above two modes as shown by b in FIG. 6.

These characteristics are arranged to be set in the second gradation converting means 23 from the operation panel 18 by selecting either one of the photograph mode, the character mode or the character-photograph mode. It is arranged in case of no selection that the character-photograph mode is selected, for instance.

As the gradation performance is deteriorated in case of the character mode, the compression rate at the time of the encoding by the encoding circuit 16 is better than in case of the photograph mode. And as the linear characteristic is set in the second gradation converting means 23 in case of the photograph mode, only the first gradation converting means 12 in the following step performs the converting of the image data like in the first embodiment (the converting characteristic set in the first converting means 12 is same as in the first embodiment).

In FIG. 6, in case of the character mode and the character-photograph mode the intermediate density area of the image data is converted to the specific low density, and also the intermediate density area can be converted to the specific high density.

Next, the construction of the image data processing apparatus in the third embodiment is explained according to FIG. 7.

The image data processing apparatus in the above description is an example of the apparatus unifying a scanner, a printer and a display screen. This embodiment refers to the conditions that a network stands between an image data processing apparatus and a terminal for searching and browsing an image data stored in a hard disc 17.

In FIG. 7, after an original image is read by an image scanner 10, the coded data of the initial resolution and that of the low-resolution are stored by the hard disc 17, and these sequence are the same as in the first embodiment.

An user of a terminal connected with a network 34 inputs a keyword for searching an image data or an ID number for specifying an image data from a keyboard 32. The keyword or ID number thus inputted is inputted to an decoding circuit 19 via a network interface 30 connected online with a network interface 31 of the terminal. The decoding circuit 19 specifies the image data according to the keyword or ID number, and decodes the encoded data of the low-resolution read from the hard disc 17, and then outputs it to the network interface 30. The network interface 30 transfers online the decoded data of the low-resolution to the network interface 31 of the terminal. The network interface 31 of the terminal displays the image data transferred online on a display screen 33.

According to the above-mentioned steps, the user can search and browse at real time the image data stored in the hard disc 17 from the distant place. In this case, by bringing the characteristic shown in FIG. 3 or 4 to the first gradation converting means 12 it is also possible to improve the compression rate when encoding the image data of the low-resolution.

In this embodiment, the encoded data was transferred online after the decoding, but if the terminal is provided with a decoding circuit (not shown), the encoded data can be transferred directly. And as a result the data size to be transferred is so small that the transfer time can be shorten. Therefore the performance of the response in the terminal operation can be improved.

Moreover, the constitution of an image data processing apparatus in the fourth embodiment is explained according to FIG. 8.

It is arranged in this embodiment that, after the image data stored in the hard disc 17 is decoded by the decording circuit 19, a removable media drive 40 stores it to a removable media The term of the removable media means a mass removable storage media such as a ZIP or CD-R.

And since the terminal is also provided with a removal media drive 41, it is possible to read out the image data stored by the removable media drive. The terminal comprises the removable media drive 41, a keyboard 42 for selecting one out of a plural image data stored in the media, a display screen 43 for displaying the searched image data, CPU and a working memory for controlling those units according to the internal software (both are not shown).

In FIG. 8, after reading an image data by the image scanner 10, the encoded data of the initial resolution and that of the low-resolution are stored in the hard disc 17, and those steps are the same as in the first and the third embodiment.

When an user inputs a keyword or an ID number for searching the image data store in the the hard disc 17 to the decoding circuit 19 from the operation panel 18, the decoding circuit 19 specifies and decodes the image data stored in the hard disc 17 according to the inputted keyword or ID number, and then input it to the removable media drive 40. The removable media drive 40 stores the decoded image data in the media which is inserted in.

After that, the user inserts the media storing the image data into the removable media drive 41 of the terminal, and selects one out of the image data stored in the media by the keyboard 42. The removable media drive 41 read the selected image data from the media, and displays it on the display screen 43.

According to the above-mentioned description in this embodiment, by intervening the removable media the terminal user can browse the image data stored in the hard disc 17 in a place distant from the image data processing apparatus itself.

In this embodiment, by setting the characteristic shown in FIG. 3 or 4 in the first gradation converting means 12, it is also possible to improve the compression rate when encoding the image data of the low-resolution.

And it is arranged in this embodiment that the encoded data is stored in the media after the decoding but it is needless to say that, if the terminal is provided with a decoding circuit (not shown) the encoded data can be stored in the media without the decoding. In this case, it is needless to say that the number of image data able to be stored in a removable media increases.

Figure 9:
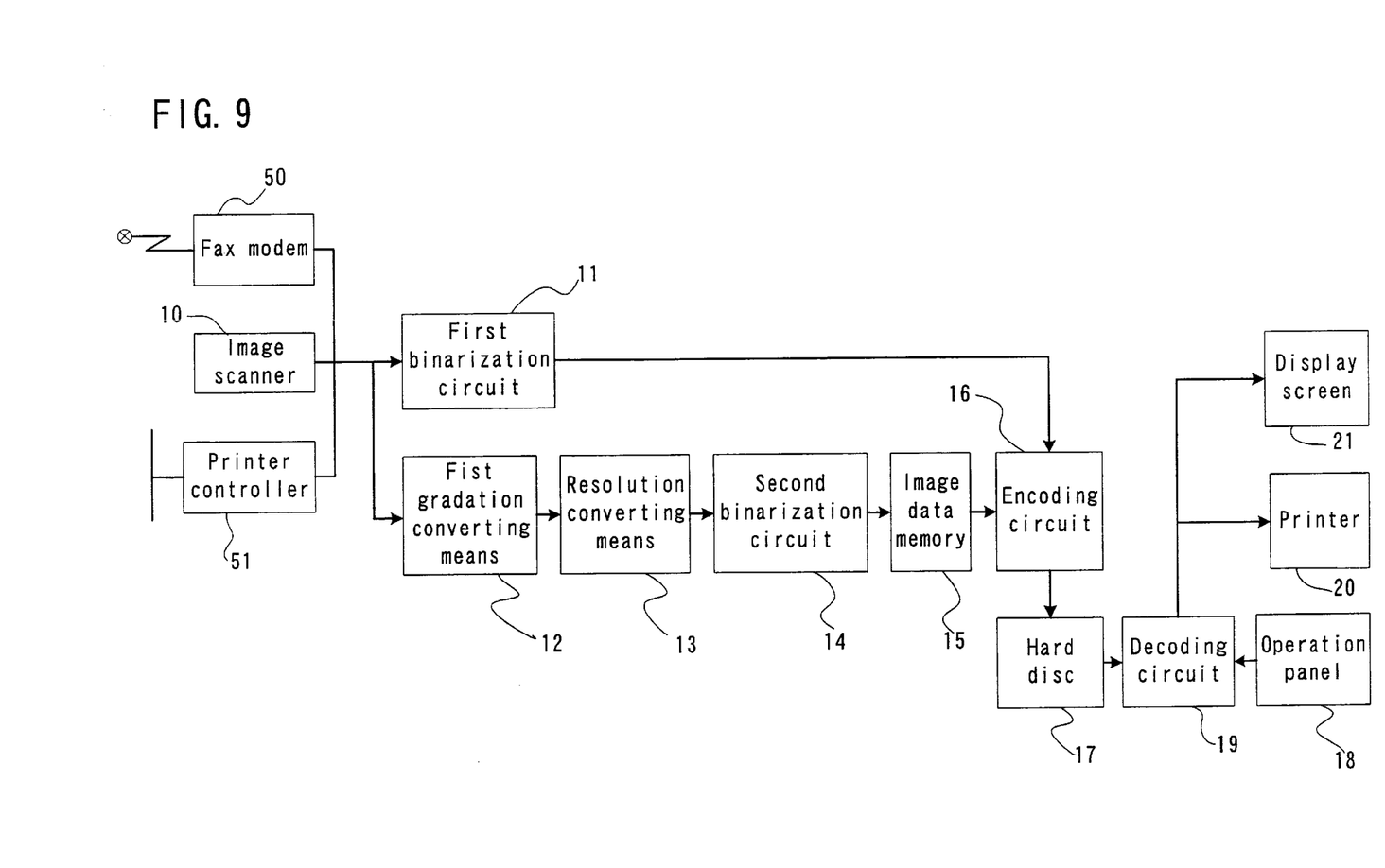
FIG. 9 is a schematic block diagram of an image data processing apparatus in the fifth embodiment of the invention.

All of the image data described in the above embodiment are arranged to be read by the image scanner 10, but it can be arranged that the image data is outputted from the a fax modem 50 that receives the image data via a public line, or a printer controller that receives the image data via a dedicated line or a network.

As described above, it is arranged in an image data processing apparatus in this invention for storing not only a standard image data of the high-resolution but also an image data of the low-resolution and searching the image data of the low-resolution by the display screen that the gradation performance in the intermediate density area of the image data of the low-resolution for the searching is deteriorated to a specific degree without touching the picture quality and thereby the size of the image data in the intermediate density area can be reduced. Accordingly, since the proportion of the gradation change when encoding the binary image data is reduced, the encoded volume can be reduced, too. Therefore it is possible to improve the compression rate at the time of the encoding and the storage efficiency at the filing.

In this case, since the image data displayed on the display screen has the low-resolution, even if the gradation performance is deteriorated, there is very few influence on the picture quality. Meanwhile, since as the image data for the printing the standard image data of the high-resolution is used, it will not occur that the picture quality is deteriorated. And, since there is no need for the original of characters to give attention to the gradation performance, the gradation performance of the image data for the printing can be deteriorated. Therefore it is possible to improve the storage efficiency.

What is claimed is:

1. An image data processing apparatus for encoding a multi-valued image data inputted from image data inputting means not only as a standard image data but also as a display image data of lower resolution than that of the standard image data, storing both encoded data, and outputting the stored display image data after the decoding, said apparatus comprising:

first gradation converting means for converting an intermediate density area of the multi-valued image data to a specific high-density or a specific low-density, and resolution converting means for obtaining the display image data.

2. An image data processing apparatus according to claim 1 which is provided with second gradation converting means for converting the intermediate density area of the multi-valued image data that is inputted from the image inputting means to a second specific high-density or a second specific low-density.

3. An image data processing apparatus according to claim 1 which is provided with image data transferring means for transferring online the display image data encoded, and browsing means for displaying the display image data transferred from the image data transferring means.

4. An image data processing apparatus according to claim 1 which is provided with image data transferring means for transferring online an encoded data corresponding to the display image data stored by the storage means, decoding means for decoding the encoded data transferred from the image data transferring means, and browsing means for displaying the decoded image data.

5. An image data processing apparatus according to claim 1 which is provided with image data writing means for storing the decoded display image data in a removable storage media, image data reading means for reading the display image data acquired from the removable storage media, and browsing means for displaying the display image data thus read.

6. An image data processing apparatus according to claim 1 which is provided with image data writing means for storing the encoded image data corresponding to the display image data stored by the storage means in a removable storage media, image data reading means for reading the encoded image data from the removable storage media, decoding means for decoding the encoded image data thus read, and browsing means for displaying the decoded image data.

7. An image data processing apparatus according to claim 1 wherein, in case of converting the intermediate density area of the multi-valued image data to the specific low density, the resolution converting means performs interpolating for making the image data a specific high density.

8. An image data processing apparatus according to claim 1 wherein the first gradation converting means converts the multi-valued image data.

9. An image data processing apparatus according to claim 1 wherein the first gradation converting means is a combination logical circuit for converting the multi-valued image data.

10. An image data processing apparatus according to claim 2 wherein the second gradation converting means converts the multi-valued image data.

11. An image data processing apparatus according to claim 2 wherein the second gradation converting means is a combination logical circuit for converting the multi-valued image data.

12. An image data processing apparatus according to claim 1 wherein the image data inputting means is at least one among an image scanner for reading the original image optically, a fax modem for receiving the image data via a dedicated line or a public line and a printer interface for receiving the image data via the dedicated line or a network.

13. An image data processing method for displaying a multi-valued image data inputted from image data inputting means on browsing means, said method comprising the steps of:

converting an intermediate density area of the multi-valued image data inputted from the image data inputting means to a specific high density or a specific low density;

converting the image data after the first gradation converting to a specific low-resolution;

encoding the multi-valued image data inputted from the image data inputting means as a standard image data while encoding the image data after the first gradation converting as a display image data; and decoding and displaying the display image data.

14. An image data processing method according to claim 13 which comprises the second gradation converting for converting the intermediate density area of the multi-valued image data obtained by the above processings to a specific high density or a specific low density just after the processings.

15. An image data processing apparatus according to claim 2 wherein the first gradation means is provided in front of the resolution converting means and outputs the data to the resolution converting means.

16. An image data processing apparatus according to claim 1 wherein the multi-valued image data to be inputted is at least one among an image data inputted from an image scanner reading original images, an image data received by a fax modem via dedicated line or a public line and an image data received by a printer interface via dedicated line or public line.

17. An image data processing apparatus according to claim 8 wherein the first gradation converting means converts the multi-valued image data according to the contents of a look-up table.

18. An image data processing apparatus according to claim 10 wherein the second gradation converting means converts the multi-valued image data according to the contents of a look-up table.

19. An image data processing apparatus according to claim 1, wherein the gradation means outputs the data to the resolution converting means.

* * * * *